(12) United States Patent
Yeates et al.

(10) Patent No.: US 8,724,285 B2
(45) Date of Patent: May 13, 2014

(54) COSMETIC CONDUCTIVE LASER ETCHING

(75) Inventors: Kyle H. Yeates, Palo Alto, CA (US); Michael Nashner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 496 days.

(21) Appl. No.: 12/895,591

(22) Filed: Sep. 30, 2010

(65) Prior Publication Data

US 2012/0081830 A1    Apr. 5, 2012

(51) Int. Cl.
| | | |
|---|---|---|
| H01H 47/00 | (2006.01) | |
| H05F 3/00 | (2006.01) | |
| H05F 3/02 | (2006.01) | |
| H02H 9/00 | (2006.01) | |
| H02H 3/22 | (2006.01) | |
| B23K 26/00 | (2006.01) | |

(52) U.S. Cl.
USPC ............ 361/220; 361/56; 361/91.1; 361/111; 219/121.85

(58) Field of Classification Search
USPC .............. 361/56, 220, 111, 91.1; 219/121.85
See application file for complete search history.

(56) References Cited

U.S. PATENT DOCUMENTS

| | | | |
|---|---|---|---|
| 2,647,079 A | 7/1953 | Burnham | |
| 2,812,295 A | 11/1957 | Patrick | |
| 2,990,304 A | 6/1961 | Cybriwsky et al. | |
| 3,216,866 A | 11/1965 | Orlin | |
| 3,526,694 A | 9/1970 | Lemelson | |
| 3,645,777 A | 2/1972 | Sierad | |
| 2,346,531 A | 1/1981 | Adachi et al. | |
| 4,247,600 A | 1/1981 | Adachi et al. | |
| 4,269,947 A | 5/1981 | Inata et al. | |
| 4,531,705 A | 7/1985 | Nakagawa et al. | |
| 4,547,649 A * | 10/1985 | Butt et al. | ................ 219/121.66 |
| 4,564,001 A | 1/1986 | Maeda | |
| 4,756,771 A | 7/1988 | Brodalla et al. | |
| 2,989,325 A | 6/1990 | Mullaney | |
| 4,931,366 A | 6/1990 | Mullaney | |
| 4,993,148 A | 2/1991 | Adachi et al. | |
| 5,224,197 A | 6/1993 | Zanoni et al. | |
| 5,288,344 A | 2/1994 | Peker et al. | |
| 5,417,905 A | 5/1995 | Lemaire et al. | |
| 5,645,964 A | 7/1997 | Nohr et al. | |
| 5,808,268 A | 9/1998 | Balz | |
| 5,837,086 A | 11/1998 | Leeb et al. | |

(Continued)

FOREIGN PATENT DOCUMENTS

| | | |
|---|---|---|
| CN | 1362125 A | 8/2002 |
| CN | 1306526 C | 3/2007 |

(Continued)

OTHER PUBLICATIONS

Annerfors et al., "Nano Molding Technology on Cosmetic Aluminum Parts in Mobile Phones", Division of Production and Materials Engineering, LTH, 2007.

(Continued)

*Primary Examiner* — Jared Fureman
*Assistant Examiner* — Lucy Thomas

(57) ABSTRACT

Techniques or processes for providing markings on products are disclosed. Particular arrangements of input devices may provide enhancements in ease of use. Further, cosmetic laser marking of input devices may provide improved visual appearance. Additionally, selectively controlling laser operation parameters during laser marking may provide laser marking that may be substantially electrically conductive, which in turn may be helpful in electrostatic discharge protection.

29 Claims, 16 Drawing Sheets

(56) References Cited

U.S. PATENT DOCUMENTS

| | | | |
|---|---|---|---|
| 5,872,699 A | 2/1999 | Nishii et al. | |
| 5,925,847 A | 7/1999 | Rademacher et al. | |
| 6,007,929 A | 12/1999 | Robertson et al. | |
| 6,101,372 A | 8/2000 | Kubo | |
| 6,169,266 B1 | 1/2001 | Hughes | |
| 6,325,868 B1 | 12/2001 | Kim et al. | |
| 6,331,239 B1 | 12/2001 | Shirota et al. | |
| 6,480,397 B1 | 11/2002 | Hsu et al. | |
| 6,540,867 B1 | 4/2003 | Cochran | |
| 6,574,096 B1 | 6/2003 | Difonzo et al. | |
| 6,590,183 B1 | 7/2003 | Yeo | |
| 6,633,019 B1 | 10/2003 | Gray | |
| 6,746,724 B1 | 6/2004 | Robertson et al. | |
| 6,966,133 B2 | 11/2005 | Krings et al. | |
| 6,996,425 B2 | 2/2006 | Watanabe | |
| 7,134,198 B2 | 11/2006 | Nakatani et al. | |
| 7,181,172 B2 | 2/2007 | Sullivan et al. | |
| 7,225,529 B2 | 6/2007 | Wang | |
| 7,459,373 B2 | 12/2008 | Yoo | |
| 7,508,644 B2 * | 3/2009 | Cheung et al. | 361/128 |
| 7,622,183 B2 | 11/2009 | Shirai et al. | |
| 7,636,974 B2 | 12/2009 | Meschter et al. | |
| 7,691,189 B2 | 4/2010 | En et al. | |
| 8,192,815 B2 | 6/2012 | Weber et al. | |
| 8,367,304 B2 | 2/2013 | Heley et al. | |
| 8,379,678 B2 | 2/2013 | Zhang et al. | |
| 8,379,679 B2 | 2/2013 | Zhang et al. | |
| 8,451,873 B2 | 5/2013 | Zhang | |
| 2001/0030002 A1 | 10/2001 | Zheng et al. | |
| 2002/0058737 A1 | 5/2002 | Nishiwaki et al. | |
| 2002/0097440 A1 | 7/2002 | Paricio et al. | |
| 2002/0109134 A1 | 8/2002 | Iwasaki et al. | |
| 2002/0130441 A1 | 9/2002 | Robinson et al. | |
| 2002/0160145 A1 | 10/2002 | Bauhoff | |
| 2003/0006217 A1 | 1/2003 | Dance | |
| 2003/0024898 A1 | 2/2003 | Natsume et al. | |
| 2005/0023022 A1 | 2/2005 | Kriege et al. | |
| 2005/0034301 A1 | 2/2005 | Wang | |
| 2005/0115840 A1 | 6/2005 | Dolan | |
| 2005/0158576 A1 | 7/2005 | Groll | |
| 2005/0263418 A1 | 12/2005 | Bastus | |
| 2006/0055084 A1 | 3/2006 | Yamaguchi et al. | |
| 2006/0066771 A1 | 3/2006 | Hayano et al. | |
| 2006/0105542 A1 | 5/2006 | Yoo | |
| 2007/0018817 A1 | 1/2007 | Marmaropoulos et al. | |
| 2007/0045893 A1 | 3/2007 | Asthana et al. | |
| 2007/0053504 A1 | 3/2007 | Sato et al. | |
| 2007/0262062 A1 | 11/2007 | Guth | |
| 2007/0275263 A1 | 11/2007 | Groll | |
| 2008/0165485 A1 | 7/2008 | Zadesky et al. | |
| 2008/0166007 A1 | 7/2008 | Hankey | |
| 2008/0241478 A1 | 10/2008 | Costin et al. | |
| 2008/0311369 A1 | 12/2008 | Yokoyama et al. | |
| 2008/0311370 A1 | 12/2008 | Yokoyama et al. | |
| 2009/0017242 A1 | 1/2009 | Weber et al. | |
| 2009/0091879 A1 | 4/2009 | Lim | |
| 2009/0104949 A1 | 4/2009 | Sato et al. | |
| 2009/0190290 A1 | 7/2009 | Lynch et al. | |
| 2009/0194444 A1 | 8/2009 | Jones | |
| 2009/0236143 A1 | 9/2009 | Nakamura | |
| 2009/0260871 A1 | 10/2009 | Weber et al. | |
| 2009/0305168 A1 | 12/2009 | Heley et al. | |
| 2010/0015578 A1 | 1/2010 | Falsafi et al. | |
| 2010/0061039 A1 * | 3/2010 | Sanford et al. | 361/679.01 |
| 2010/0065313 A1 | 3/2010 | Takeuchi et al. | |
| 2010/0159273 A1 | 6/2010 | Filson et al. | |
| 2010/0209721 A1 | 8/2010 | Irikura et al. | |
| 2010/0209722 A1 | 8/2010 | Irikura et al. | |
| 2010/0294426 A1 | 11/2010 | Nashner | |
| 2010/0300909 A1 | 12/2010 | Hung | |
| 2011/0008618 A1 | 1/2011 | Weedlun | |
| 2011/0048755 A1 | 3/2011 | Su et al. | |
| 2011/0051337 A1 | 3/2011 | Weber et al. | |
| 2011/0089039 A1 | 4/2011 | Nashner et al. | |
| 2011/0089067 A1 | 4/2011 | Scott et al. | |
| 2011/0123737 A1 | 5/2011 | Nashner et al. | |
| 2011/0186455 A1 | 8/2011 | Du et al. | |
| 2011/0193928 A1 | 8/2011 | Zhang et al. | |
| 2011/0193929 A1 | 8/2011 | Zhang et al. | |
| 2011/0194574 A1 | 8/2011 | Zhang et al. | |
| 2011/0155901 A1 | 10/2011 | Hum et al. | |
| 2011/0253411 A1 | 10/2011 | Hum et al. | |
| 2011/0315667 A1 | 12/2011 | Reichenbach et al. | |
| 2012/0043306 A1 | 2/2012 | Howerton et al. | |
| 2012/0081830 A1 | 4/2012 | Yeates et al. | |
| 2012/0100348 A1 | 4/2012 | Brookhyser et al. | |
| 2012/0248001 A1 | 10/2012 | Nashner | |
| 2012/0275130 A1 | 11/2012 | Hsu et al. | |
| 2013/0075126 A1 | 3/2013 | Nashner et al. | |
| 2013/0083500 A1 | 4/2013 | Prest et al. | |

FOREIGN PATENT DOCUMENTS

| | | |
|---|---|---|
| DE | 195 23 112 | 6/1996 |
| DE | 102005048870 A1 | 4/2007 |
| EP | 0 114 565 A1 | 8/1984 |
| EP | 0 633 585 A | 1/1995 |
| EP | 2 399 740 A1 | 12/2011 |
| GB | 788 329 A | 12/1957 |
| JP | 57-149491 A | 9/1982 |
| JP | 03 013331 A | 1/1991 |
| JP | 03 138131 A | 6/1991 |
| JP | 3-203694 A | 9/1991 |
| JP | 06-126192 | 5/1994 |
| JP | 7-204871 A | 8/1995 |
| JP | 2000-000167 | 1/2000 |
| JP | 2003055794 | 2/2003 |
| JP | 2008 087409 A | 4/2008 |
| WO | WO 98/53451 | 11/1998 |
| WO | EP 0 997 958 A1 | 5/2000 |
| WO | WO 0077883 | 12/2000 |
| WO | WO 01/15916 A1 | 3/2001 |
| WO | WO 01/34408 | 5/2001 |
| WO | WO 2006/124279 A2 | 11/2006 |
| WO | WO 2008/092949 A1 | 8/2008 |
| WO | WO 2009/051218 A1 | 4/2009 |
| WO | WO 2010/095747 A1 | 8/2010 |
| WO | WO2010/135415 A2 | 11/2010 |
| WO | WO 2011/047325 A1 | 4/2011 |

OTHER PUBLICATIONS

"Thermal Shock Resistant Conformal Coating", Product Data Sheet, Dymax Corporation, Jul. 9, 2007, pp. 1-2.

"Marking Lasers: Marking without Limitations", Trumpf Inc., Sep. 10, 2007, pp. 1-36.

"UV-Curing Sheet Adhesives", ThreeBond Technical News, Issued Jul. 1, 2009, 8 pages.

Chang, "Lasers Make Other Metals Look Like Gold", New York Times, nytimes.com, 2 pgs., Jan. 31, 2008.

"Database EPI" Week 201107 Thomas Scientific, London, GB; AN 2010-Q46184, Nov. 17, 2010, 1 pg.

* cited by examiner

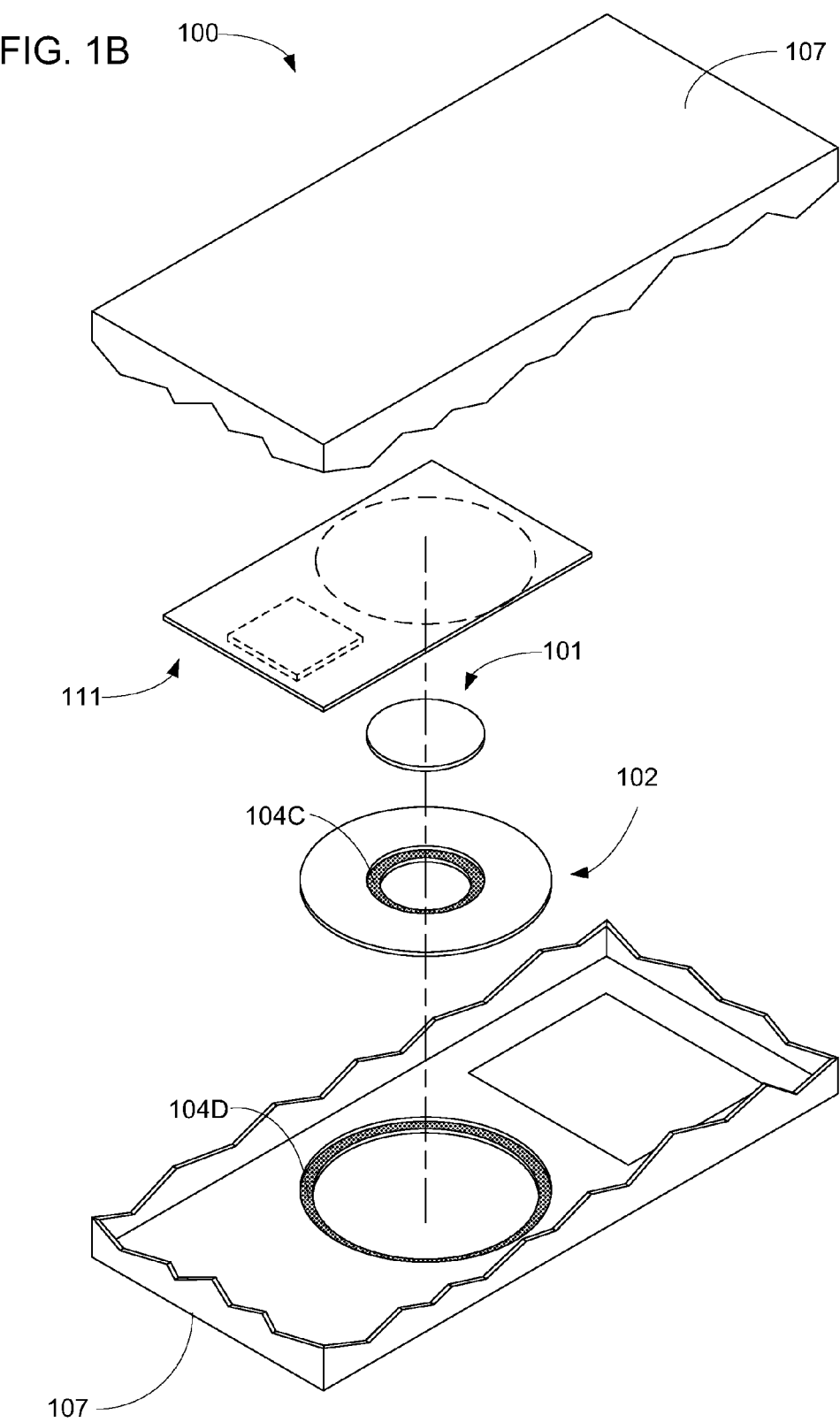

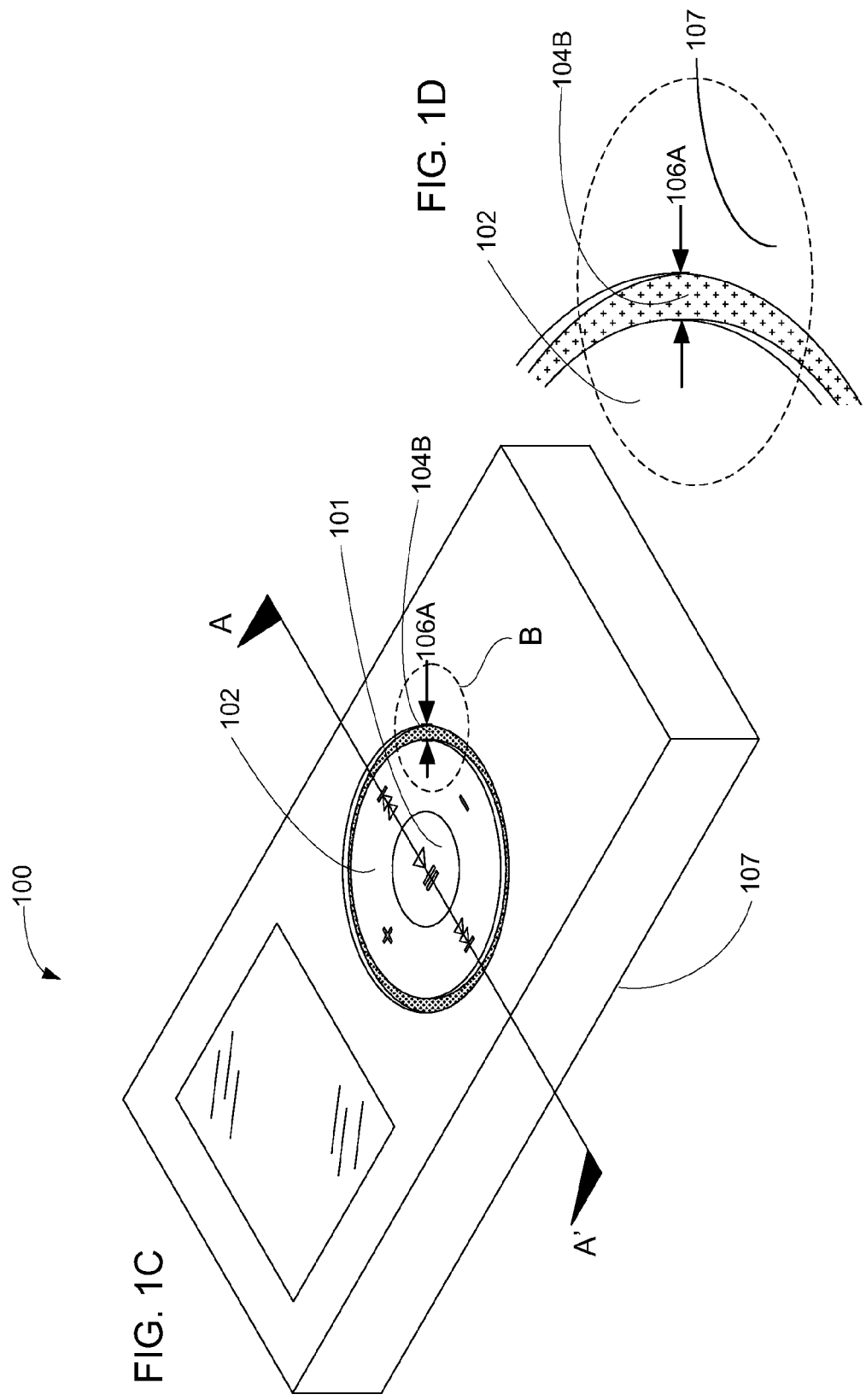

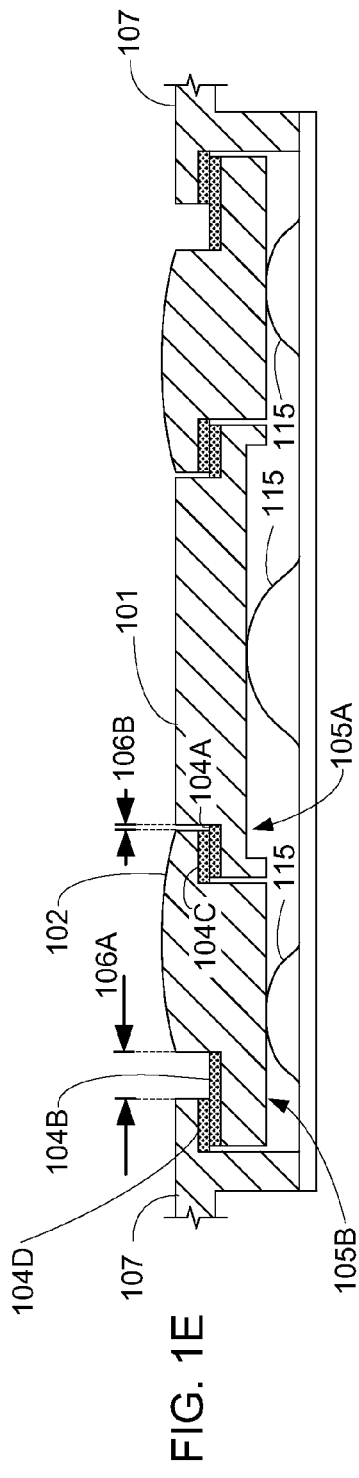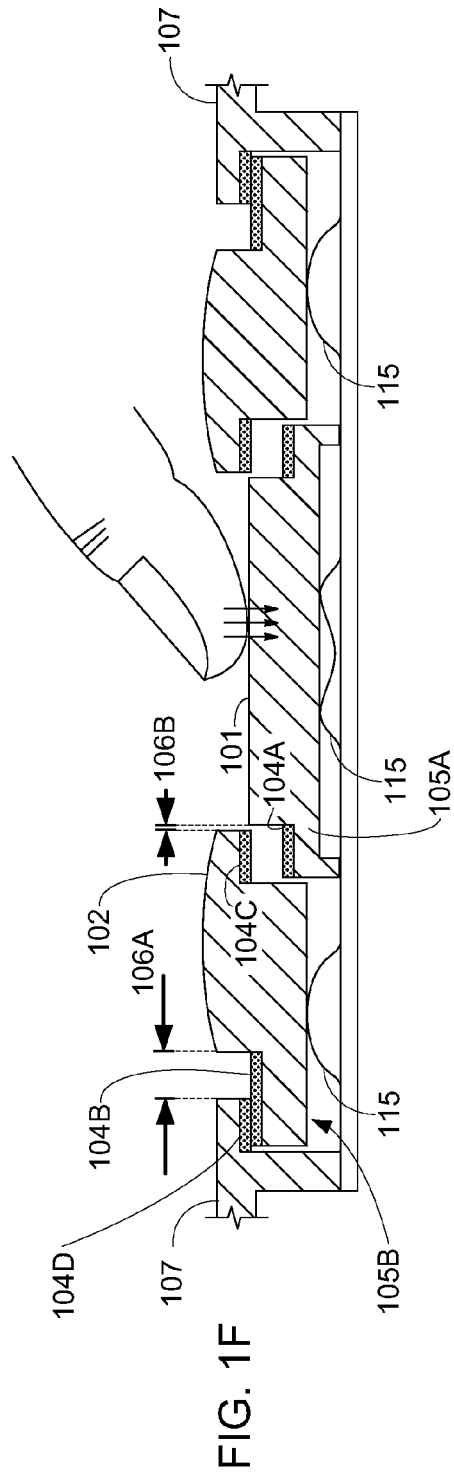

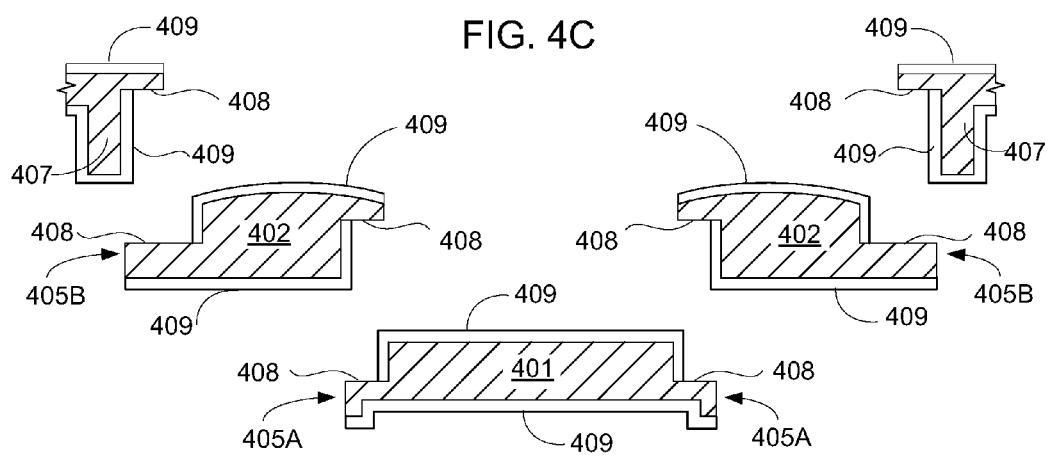
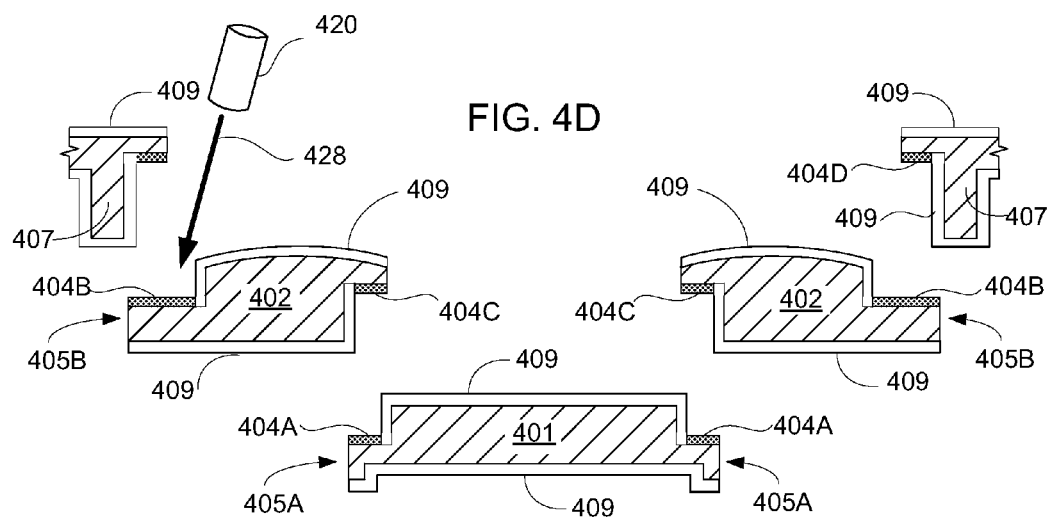

FIG. 4E

| Laser Model | FOBA DP20GS | SPI 12W/SM | SPI 20W/SM | Lumera |
|---|---|---|---|---|
| Laser Type | DPSS YV04 | Fiber | Fiber | Picosecond |
| Average Power in Watts | 18.4 | 9 | 18 | 2.5 |
| Wavelength in Nanometers | 1064 | 1062 | 1062 | 1064 |
| Pulse Width in Nanoseconds | 20 | 10 to 50 | 12 | 0.015 |
| Frequency in Kilohertz | 40 | 100 to 240 | 400 | 500 |
| Pulse Energy in milliJoules | 0.46 | 0.04 to 0.09 | 0.045 | 0.005 |
| Peak Power in Kilowatts | 23 | 0.75 to 9 | 3.75 | 333 |
| Spot Diameter (1/e^2) in microns | 250 | 80 | 80 | 80 |
| Fluence in Joules per square centimeter | 0.94 | 0.08 to 1.80 | 0.90 | 0.10 |
| Irradiance in Gigawatts per square centimeter | 0.05 | 0.01 to 0.18 | 0.003 | 6.63 |
| Line Spacing in microns | 10 | 5 to 20 | 3 | 20 |
| Scan Speed in millimeters per second | 20 | 20 | 20 | 20 |

COSMETIC CONDUCTIVE LASER ETCHING

BACKGROUND OF THE INVENTION

1. Field of the Invention

The present invention relates generally to marking products and, more particularly, to marking of electronic devices with user input devices

2. Description of the Related Art

There are various styles of input devices used in consumer electronics. Some input devices include buttons, switches, keyboards, mice, trackballs, touch pads, joy sticks, touch screens, and the like. Each of these devices has advantages and disadvantages that are taken into account when designing the consumer electronic device.

Conventional externally accessible arrays buttons and switches may provide limited control with regard to user input, and may be confusing or visually unattractive to users. Further, users may acquire unwanted static electric charge, which may damage consumer electronic devices. In particular, unwary users handling sensitive electronic equipment may transfer static electric charge to input devices. Unwanted static electric charge may accumulate at such input devices, if suitable precautions are not taken.

Thus, there is a continuing need for improved approaches to make consumer electronic devices that are not only easy to use, visually appealing and cosmetically attractive, but also provide suitable precautions to avoid unnecessary damage from static discharge.

SUMMARY

The invention is related to apparatus, systems and methods, which may improve ease of use, visual appearance, and/or electrostatic discharge protection for consumer electronic products. Particular arrangements of input devices may provide enhancements in ease of use. Cosmetic laser marking of input devices may provide improved visual appearance. Further, selectively controlling laser operation parameters during laser marking may provide laser marking that may be substantially electrically conductive, which in turn may be helpful in electrostatic discharge protection.

The invention can be implemented in numerous ways, including as a method, system, device, or apparatus. Several embodiments of the invention are discussed below.

As a method of interacting with a consumer electronic product, one embodiment comprises at least the acts of: providing an aperture extending inwardly from an outer surface of the consumer electronic product, and an underlying member having a colored marked surface of the underlying member, which is at least partially visible through the aperture in the outer surface of the consumer electronic product; arranging an input device of the consumer electronic product adjacent to the aperture extending inwardly from the outer surface of the consumer electronic product; associating the input device with a plurality of input functions; and activating the input device to select at least one of the plurality of input functions.

As an apparatus, one embodiment comprises at least: a consumer electronic product having an outer surface; an aperture extending inwardly from the outer surface of the consumer electronic product; an underlying member; and a colored marked surface of the underlying member, wherein the colored marked surface of the underlying member is substantially visible through the aperture in the outer surface of the consumer electronic product, and wherein the colored marked surface is substantially electrically conductive and arranged so as to substantially reduce any accumulation of electrical charge at the underlying member.

As an apparatus, another embodiment comprises at least: a consumer electronic product having an outer surface; an aperture extending inwardly from the outer surface of the consumer electronic product; an underlying member; and a laser marked surface of the underlying member, wherein the laser marked surface of the underlying member is arranged so as to be substantially visible through the aperture in the outer surface of the consumer electronic product.

As a method, another embodiment comprises at least the acts of: extending an aperture inwardly from an outer surface of the consumer electronic product; color marking a surface of an underlying member, so as to provide a colored marked surface of the underlying member; and arranging the colored marked surface of the underlying member so that the colored marked surface of the underlying member is substantially visible through the aperture extending inwardly from the outer surface of the consumer electronic product.

As a method, another embodiment comprises at least the acts of: anodizing a pivot member having a tab extending outwardly from the pivot member; removing anodization from the tab of the pivot member, so as to provide for the tab being substantially electrically conductive; and arranging the substantially electrically conductive tab of the pivot member with a consumer electronic product so as to substantially reduce any accumulation of electrical charge at the pivot member.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 1A-1H show various views of one embodiment of a marked consumer electronic product.

FIGS. 4A-4D are exploded partial cross-sectional view diagrams illustrating marking of metal structures according to one embodiment.

FIG. 4E is a table illustrating exemplary laser operation parameters for marking the metal structure according to one embodiment.

DETAILED DESCRIPTION OF EMBODIMENTS OF THE INVENTION

The invention pertains to techniques or processes for providing markings for consumer electronic products. In one embodiment, the consumer electronic products may have housings, and the markings may be visible through apertures extending into the consumer electronic products. For example, markings on surfaces of underlying members may be visible through the apertures in the consumer electronics products. The markings are also able to be dark, even on metal surfaces. The marking techniques may be particularly useful for smaller scale portable electronic devices, such as handheld electronic devices. Examples of consumer electronic products include, but are not limited to mobile telephones (e.g., cell phones), Personal Digital Assistants (PDAs), portable media players, remote controllers, pointing devices (e.g., computer mouse), game controllers, etc.

Exemplary embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1A:
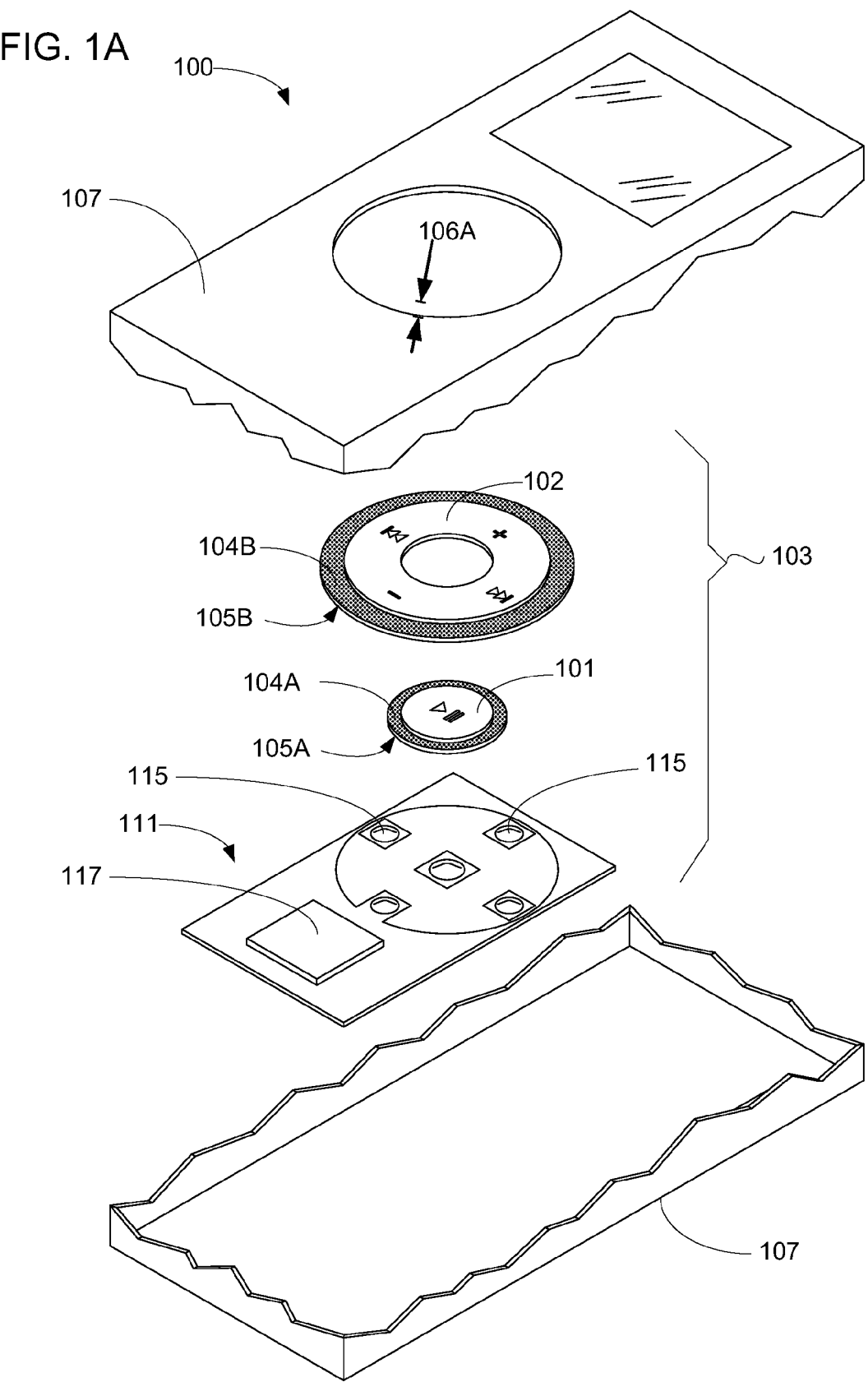
Figure 1G:
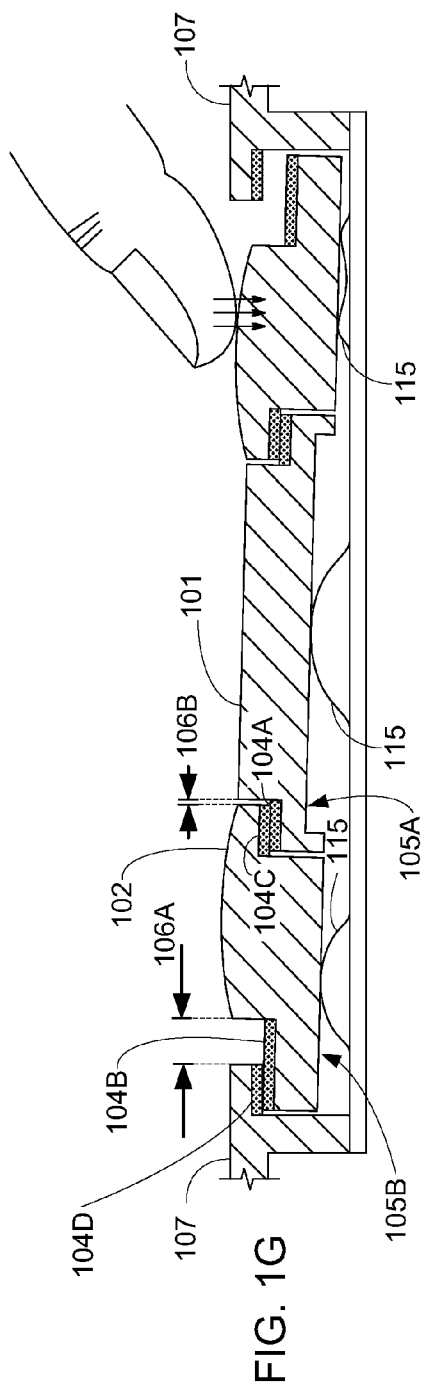
Figure 1H:
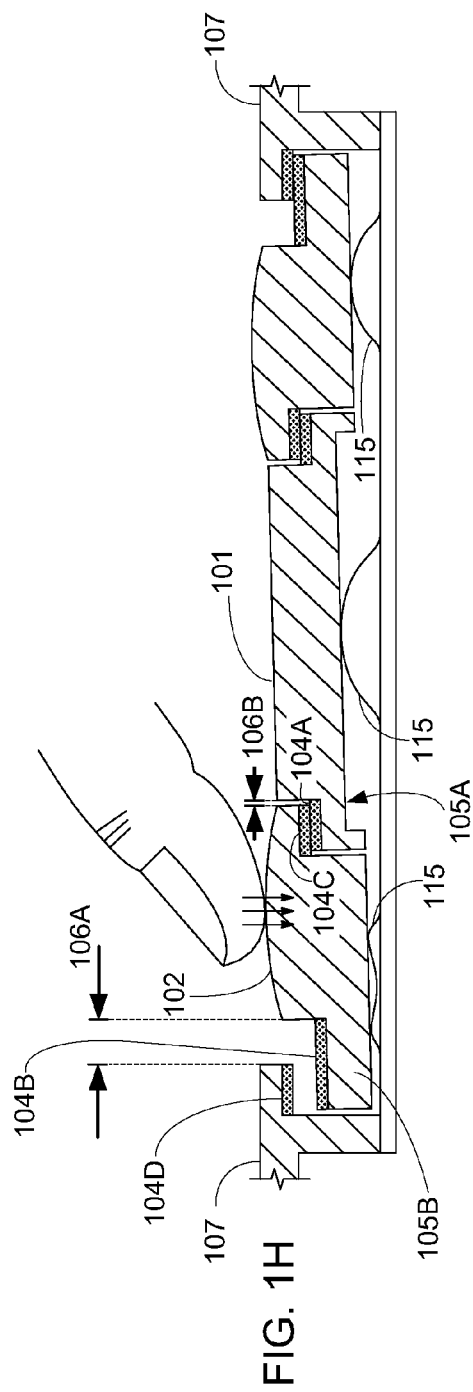

FIGS. 1A-1H show various views of one embodiment of a marked consumer electronic product 100. FIG. 1A shows a top to bottom exploded isometric view of the marked consumer electronic product 100. FIG. 1B is inverted relative to FIG. A, so as to show a bottom to top exploded isometric view of the consumer electronic product 100. FIG. 1C shows a collapsed isometric view of the marked consumer electronic product 100 shown in FIGS. 1A and 1B. FIG. 1D shows a detailed view of an aperture 106A extending into an exterior surface of the marked consumer electronic product 100. FIGS. 1E-1H illustrate a cross-sectional side view, showing operation of a marked input device of the consumer electronic product 100 with respect to a reference line A-A' shown in FIG. 1C.

As shown in various views of the marked consumer electronic product 100 in FIGS. 1A-1H, one or more pivot plates 101, 102 may comprise an input device 103 of the marked consumer electronic product. The pivot plates may comprise a central pivot plate 101 and a satellite pivot plate 102. The central pivot plate 101 and the satellite pivot plate 102 may be concentrically arranged.

There may be colored marked surfaces 104A, 104B of underlying members 105A, 105B. Underlying members 105A 105B and the colored marked surfaces 104A, 104B of the underlying members 105A, 105B may comprise a first retention tab 105A extending from the central pivot plate 101, and a second retention tab 105B extending from the satellite pivot plate, wherein each of tabs 105A, 105B may have the colored marked surfaces 104A, 104B. More particularly, underlying members 105A 105B and the colored marked surfaces 104A, 104B of the underlying members 105A, 105B may comprise a first perimeter retention flange 105A extending from the central pivot plate 101, and a second perimeter retention flange 105B extending from the satellite pivot plate 102, wherein each of perimeter retention flanges 105A, 105B may have the colored marked surfaces 104A, 104B.

As shown in FIGS. 1A-1H, an aperture 106A may extend inwardly from an outer surface of the consumer electronic product 100. The input device 103 may be arranged adjacent to the aperture 106A. Similarly, another aperture 106B, particularly shown in FIGS. 1E-1H, may extend inwardly from an outer surface of the consumer electronic product 100.

The satellite pivot plate 102 may have a perimeter, wherein the aperture 106A comprises an annular aperture interposed between the perimeter of the satellite pivot plate 102 and a remainder portion of the consumer electronic product 100. Another aperture 106B may comprise another annular aperture 106B, which may be interposed between the central pivot plate 101 and the satellite pivot plate 102.

The colored marked surfaces 104A, 104B of the underlying members 105A, 105B may be substantially visible through the apertures 106A, 106B in the outer surface of the consumer electronic product. Further the colored marked surfaces 104A, 104B may be substantially electrically conductive and arranged so as to substantially reduce any accumulation of electrical charge at the underlying member 105A, 105B.

The colored marked surfaces 104A, 104B of the underlying members 105A, 105B may be darkly colored. For example, the colored marked surfaces 104A, 104B of the underlying members 105A, 105B may be substantially brown in color. Similarly, the colored marked surfaces 104A, 104B of the underlying members 105A, 105B may be substantially black in color. As will be discussed in greater detail subsequently herein, the colored marked surfaces may be laser marked. The substantially brown color may correspond to a relatively lower laser power than black marking, and the substantially black color may correspond to a relatively higher laser power than brown marking.

In light of the foregoing, it should be understood that the laser marked surfaces 104A, 104B of the underlying members 105A, 105B may be substantially visible through the apertures 106A, 106B in the outer surface of the consumer electronic product. Further laser marked surfaces 104A, 104B may be substantially electrically conductive and arranged so as to substantially reduce any accumulation of electrical charge at the underlying member 105A, 105B.

The central pivot plate 101 and/or the satellite pivot plate 102 and/or housing 107 may comprise a metal, or more particularly may comprise an anodized metal. The metal may comprise aluminum, or more may comprise anodized aluminum. In addition to, or in place of aluminum, the metal may comprise titanium, niobium or tantalum.

The input device 103 may further comprise a circuit assembly 111 hosting a plurality of switches 115 operatively coupled with processor 117. For example five mechanical switches 115 are shown in the figures, which implement five resilient hemisphere membranes covering five push buttons. The processor 117 (e.g., CPU or microprocessor) may be configured to execute instructions and to carry out operations associated with the input device 103. Processor 117 can be a single-chip processor or can be implemented with multiple components. In addition to input functions, which are discussed in detail herein, processor 117 may also be configured to provide functionalities of a media player, and/or mobile telephones and/or Personal Digital Assistant (PDA), and or remote controller, and/or pointing device (e.g., computer mouse), and/or game controllers, etc. For the sake of simplicity of illustration of the figures, any additional components needed for such embodiments of consumer electronic products are not explicitly shown.

The plurality of switches 115 associated with a plurality of input functions, each switch 115 being configured to detect at least a respective one, or more, of a plurality of user inputs. For example, using instructions retrieved from memory, the processor 117 may control the reception and manipulation of input and output data. Processor 117 may be configured to receive input from switches 115. In most cases, processor 117 can execute instruction under the control of an operating system or other software.

Processor 117, which may be configured to generate a respective one of a plurality of signals associated with performing a respective one of a plurality of tasks in accordance with each of the user inputs. In particular, the processor 117 may be configured to generate a respective one of a plurality of signals associated with performing a respective one of a plurality of tasks in accordance with each of a plurality of user inputs, wherein each the signals may be associated with a respective one of a plurality of commands for performing a respective one of the plurality of input functions.

The input device 103 may be associated with a plurality of select functions. In particular, the input device 103 may be associated with a plurality of input functions, wherein the plurality of input functions comprise at least one of Play, Pause, Volume Up, Volume Down, Previous, Rewind, Next, and Fast Forward functions. At least some of the plurality of input functions may be associated with top, bottom, left, right and center locations of the input device 103. For example, a top location of the satellite pivot plate 102 may show indicia of a symbol "+" and may be associated with a Volume up function. A bottom location of the satellite pivot plate 102 may show indicia of a symbol "−" and may be associated with a Volume down function. A left location of the satellite pivot plate 102 may show indicia of a symbol "|<<" and may be associated with Previous and Rewind functions. A right location of the satellite pivot plate 102 may show indicia of a symbol ">>|" and may be associated with a Next and Fast Forward functions. A center location of the central pivot plate may show indicia of a symbol "||<" and may be associated with Pause and Play functions.

The input device 103 may be activated to select at least one of the plurality of input functions. Activating the input device 103 to select at least one of the plurality of input functions may comprise tilting one or more of the pivot plates 101, 103 as particularly shown in FIGS. 1G and 1H.

The pivot plates 101, 102 may lie on top of resilient membranes of the switches 115. The switches 115 may function as movement detectors, which may be activated by movement of pivot plates 101, 102. For example, as shown in the figures, switches 115 may be positioned around or on pivot plates 101, 102 and can be activated by the tilt or other desired movement of the pivot plates 101, 102. For example, as particularly shown in FIG. 1F, central pivot plate 101 may be depressed, and such depression movement of the central pivot plate 101 may detected by resilient membrane deformation and corresponding activation of adjacent switch 115.

As shown in the figures, a user may press the pivot plates 101, 102 in the location of the desired function. For example if the user presses on top, bottom, right or left locations of the satellite pivot plate, the central pivot plate 101 and the satellite pivot plate 102 may tilt together and thus cause the resilient membrane of the corresponding adjacent switch to deform, which may in turn cause the switch 115 to be activated, which in turn may cause the corresponding function to be selected.

In accordance with the arrangement of retention tabs or flanges of underlying members 105A, 105B shown in the figures, central pivot plate 101 and satellite pivot plate 102 may be allowed to float, so as to provide for flexible selection movements, and yet still may be retained within consumer electronic product 100. As particularly shown in FIG. 1E, resilient membranes of the switches 115 can be formed in hemisphere or bubble shape that can provide a spring force to push the central pivot plate 101 into mechanical mating engagement with the satellite pivot plate 102 by way of underlying member 105A (which may be retention tab 105A or retention flange 105A extending from central pivot plate 101); and to push the satellite pivot plate 102 into mechanical mating engagement with housing 107 by way of underlying member 105B (which may be retention tab 105B or retention flange 105b extending from satellite pivot plate 101); For the sake of simplicity of illustration, housing 107 is shown in partial view in FIGS. 1E-1H.

Further, electrically conductive marking 104A, 104B, 104C, 104D shown in FIG. 1E may provide for electrically conductive mating, in addition to the foregoing mechanical mating. As particularly shown in FIG. 1E, resilient membranes of the switches 115 can be formed in the hemisphere or bubble shape that can provide the spring force to push the central pivot plate 101 into electrically conductive mating engagement with the satellite pivot plate 102 by way of electrically contacting conductive markings 104A, 104C; and to push the satellite pivot plate 102 into electrically conductive mating engagement with housing 107, by way of electrically contacting conductive markings 104B, 104D. Accordingly, in light of the foregoing, it should be understood that conductive markings 104A, 104B, 104C, 104D may be arranged so as to substantially reduce any accumulation of electrical charge at the underlying members 105A, 105B.

Figure 2A:
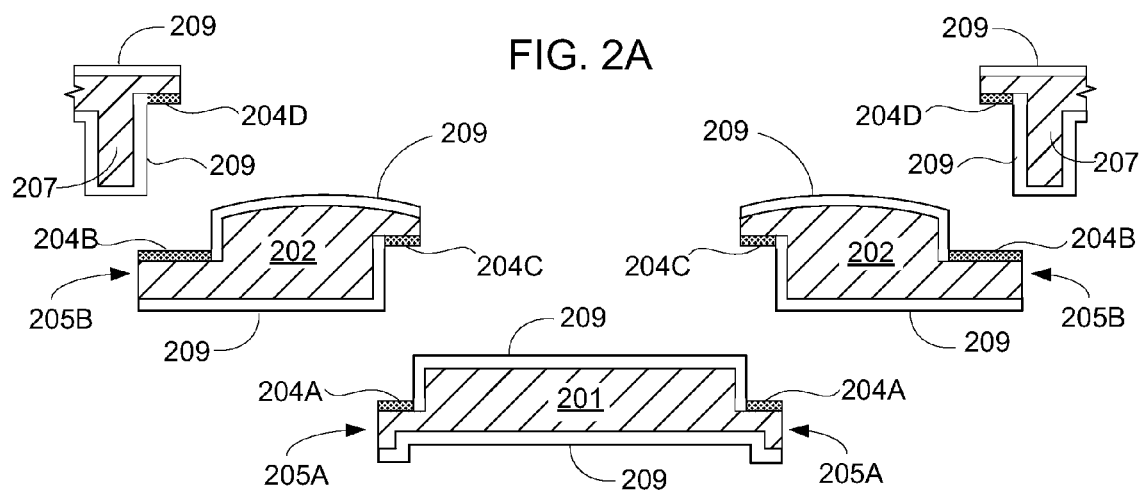
FIG. 2A is an illustration of substrates having surface alterations according to one embodiment.

FIG. 2A is an illustration of substrates 201, 202, 207 having surface alterations 204A, 204B, 204C, 204D according to one embodiment. FIG. 2A illustrates base metal structures of substrates 201, 202, 207. The surface alterations 204A, 204B, 204C, 204D may provide markings on the substrates 201, 202, 207. Further, the surface alterations 204A, 204B, 204C, 204D may be substantially electrically conductive.

One or more protective surfaces 209 can be formed or applied to at least one surface of the substrates 201, 202, 207. The protective surface 209 can be used to protect the surface of the substrate. For example, the protective surface 209 can be a more durable surface than that of the surface. The protective surface 209 may be substantially electrically insulative.

Figure 2B:
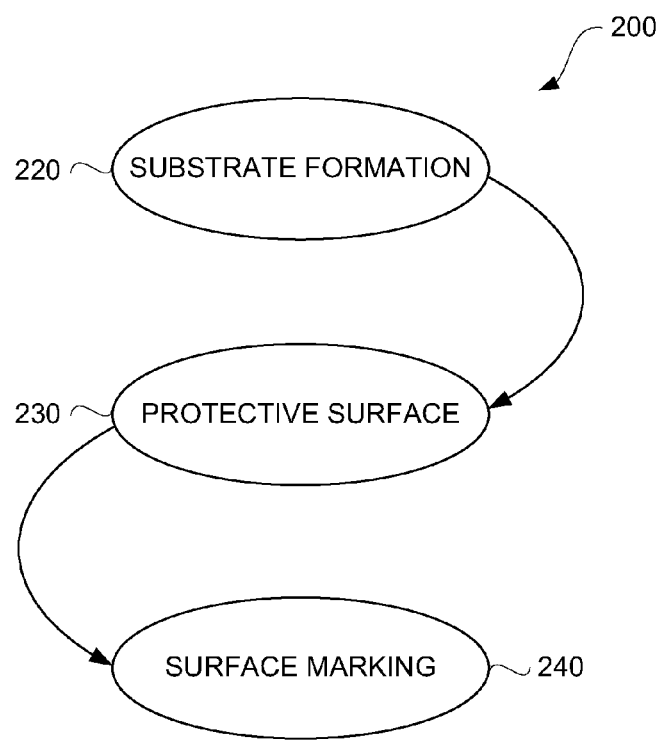
FIG. 2B is a diagram of a marking state machine 200 according to one embodiment.

FIG. 2B is a diagram of a marking state machine 200 according to one embodiment. The marking state machine 200 reflects three (3) basic states associated with marking a consumer electronic product, for example a portable electronic device.

The marking state machine 200 includes a substrate formation state 220. At the substrate formation state 220, a substrate can be obtained or produced. For example, the substrate can represent an underlying member of the consumer electronic product. Next, the marking state machine 200 can transition to a protective surface state 230. At the protective surface state 230, a protective surface can be formed or applied to at least one surface of the substrate. The protective surface can be used to protect the surface of the substrate. For example, the protective surface can be a more durable surface than that of the surface. Next, the marking state machine 200 can transition to a surface marking state 240. At the surface marking state 240, marking can be produced on a surface of the substrate.

Figure 3:
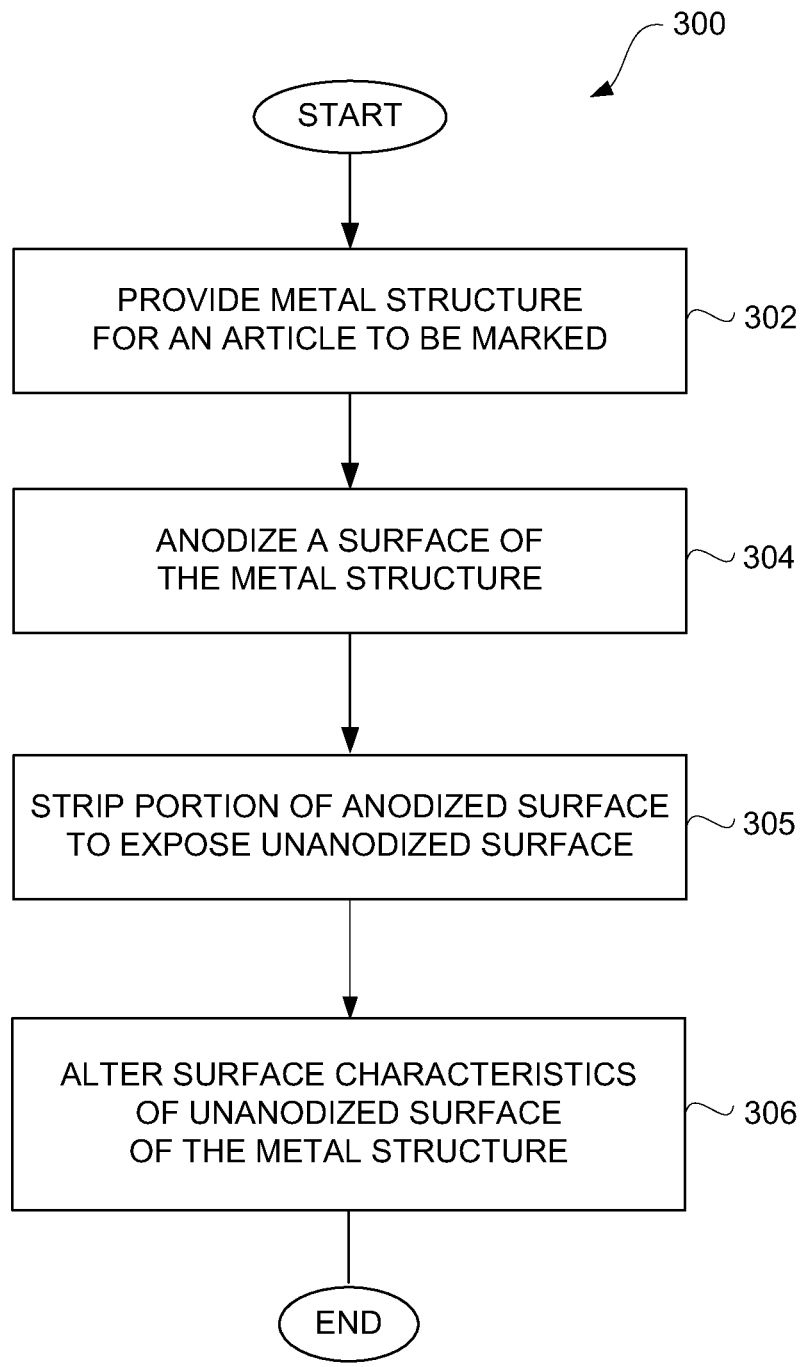
FIG. 3 is a flow diagram of a marking process 300 according to one embodiment.

FIG. 3 is a flow diagram of a marking process 300 according to one embodiment. The marking process 300 is, for example, suitable laser marking surfaces of underlying members, which may be substantially visible through the apertures in outer surfaces of consumer electronic products. The marking process 300 may be performed on a consumer electronic product that is to be marked, or more particularly, may be performed on an input device of a consumer electronic product. However, the marking may be placed in various different positions, surfaces or structures of the consumer electronic product.

The marking process 300 may provide 302 a metal structure for an article to be marked. The metal structure may pertain to one or more underlying members, or pertain to one or more input devices of a consumer electronic product, for example a portable electronic device, to be marked. The metal structure can be formed of one metal layer. The metal structure can also be formed of multiple layers of different materials, where at least one of the multiple layers is a metal layer. The metal layer may, for example, be or include aluminum, titanium, niobium or tantalum.

After the metal structure has been provided 302, a surface of the metal structure may be anodized 304. Anodization may provide some electrical insulation and/or passivation and/or protection for the metal structure. Typically, the surface of the metal structure to be anodized 304 may be an outer or exposed metal surface of the metal structure. The outer or exposed surface typically may represent an exterior surface of one or more of the underlying members or the consumer electronic product. In particular, the outer or exposed surface may comprise a pivot plate of the input device of the consumer electronic product. The pivot plate may a tab or flange extending outwardly from the pivot plate. Accordingly, the pivot plate having the tab or flange extending outwardly from the pivot plate may be anodized.

Thereafter, a portion of the anodized surface may be stripped 305 of anodization to expose an unanodized surface. For example, a portion of the anodized surface may be removed from one or more of the underlying members, so as to provide for some electrical conductivity through the unanodized surface. Laser ablation or an application of an acid solution may be used. A mixed solution of 0.2 Molar chromic acid and 0.4 Molar phosphoric acid. In case of emersion in the acid solution, photosensitive polyimide may be used for selectively masking a remainder of the anodized surface, so as to inhibit substantially any removal of the remainder of the anodized surface (i.e. the remainder that is not intended to be stripped.)

In particular, at least some anodization may be removed from the tab or flange of the pivot plate, so as to provide for the tab or flange being substantially electrically conductive. Removing the anodization from the tab or flange of the pivot plate may comprise laser ablating the anodization from the tab or flange of the pivot plate. Alternatively, the acid solution may be use to remove the anodization from the tab or flange of the pivot plate.

Thereafter, surface characteristics of selected portions of the inner unanodized surface of the metal structure may be altered 306, which may provide color marking one or more of the underlying members or the consumer electronic product. The color marking may comprise laser marking.

In particular, the color marking may comprise color marking of the surface (for example the unanodized surface) of the tab or flange of the pivot plate. The color marking may comprise laser marking the surface (for example the unanodized surface) of the tab of the pivot plate.

The resulting color marking or laser marking may be substantially electrically conductive. The altered surface, or altered structures of the surface, resulting from the color marking or laser marking may have a relative metal content that is substantially higher than relative metal content of the anodized surface (which may be substantially electrically insulating.) For example, in the case of a metal structure comprising aluminum, and anodic aluminum oxide, Energy Dispersive Spectroscopy (EDS) suggests that relative metal content of the resulting color marking (or laser marking) may be as high as approximately 44% aluminum, which may be substantially higher than relative metal content of the anodic aluminum oxide.

Electrical conductivity of the resulting color marking or laser marking may be used to substantially reduce any accumulation of electrical charge at one or more underlying members. In particular, electrical conductivity of the resulting color marking or laser marking may be used to substantially reduce any accumulation of electrical charge at the tab or flange of the pivot plate, which may be substantially electrically conductive. The substantially electrically conductive tab of the pivot plate may be arranged with the consumer electronic product so as to substantially reduce any accumulation of electrical charge at the pivot plate.

Various lasers may be used for the laser marking. The surface characteristics may be altered 306 using a laser, such as an infrared wavelength laser (e.g., picosecond pulsewidth infrared laser or nanosecond pulsewidth infrared laser). For example, one specific suitable laser is a six (6) Watt infrared wavelength picosecond pulsewidth laser at 1000 KHz with a scan speed of 50 mm/sec. While such picosecond pulsewidth laser may provide many advantages, it may be more expensive than an alternative nanosecond pulsewidth laser. Accordingly, an example of a suitable alternative laser is a ten (10) Watt infrared wavelength nanosecond pulsewidth lasers at 40 KHz with a scan speed of 20 mm/sec.

For marking, fluence of pulses of the laser may be selected so as to be approximately less than an ablation threshold fluence that characterizes the metal. Selection of the laser fluence may be for substantially avoiding ablation of the metal during marking. Further, for marking, fluence of pulses of the laser may be selected so as to be greater than a damage fluence that characterizes the metal, so as to provide for altering surface characteristics of the selected portions of the unanodized surface of the metal structure. Following the block 306, the marking process 300 can end.

Figure 4A:
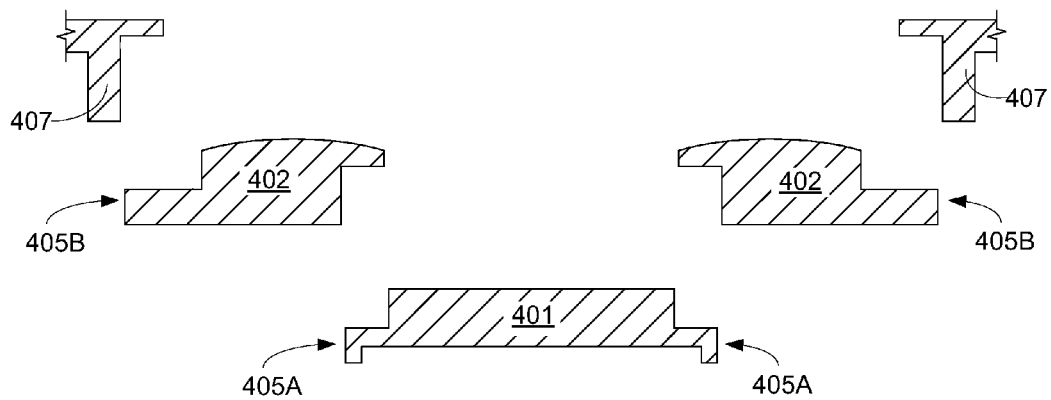

FIGS. 4A-4D are exploded partial cross-sectional view diagrams illustrating marking of metal structures according to one embodiment. FIG. 4A illustrates base metal structures 401, 402, 407. As examples, the base metal structure structures 401, 402, 407 may be formed of, or may comprise, aluminum, titanium, niobium or tantalum. One or more of the base metal structures may comprise underlying members, for use in consumer electronic products, as discussed previously herein. The base metal structures may comprise a central pivot plate 401, a satellite pivot plate 402, and a housing 407 (wherein the housing 407 is shown in partial view, for purposes of simplicity of illustration in FIGS. 4A-4D.) The base metal structures may be machined, molded or otherwise formed, as shown for example in FIG. 4A. Retention tabs (or flanges) 405A, 405B may be formed to extend outwardly from pivot plates 401, 402, as shown in FIGS. 4A-4D.

Figure 4B:
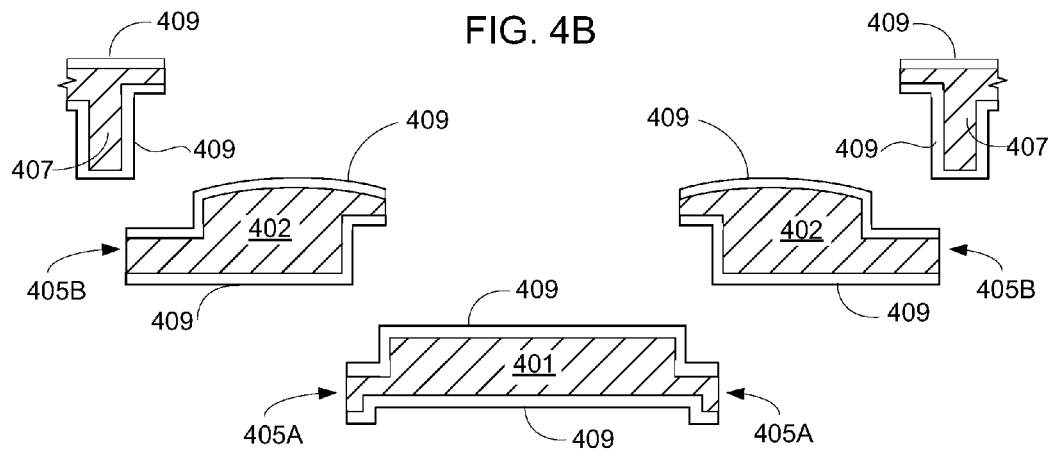

FIG. 4B illustrates the base metal structures 401, 402, 407 after surfaces have been anodized to form anodized surfaces 409. The thickness of the anodized surface 409 may, for example, be about five (5) to twenty (20) microns. After the anodized surfaces 409 have been formed on the base metal structures 401, 402, 407, FIG. 4C illustrates the base metal structures 401, 402, 407 after portions of the anodized surface have been stripped of anodization to expose unanodized surfaces 408. Various ways for selectively removing anodization from the anodized surface may be used. For example, as discussed previously herein, laser ablation or an application of an acid solution may be used. If acid emersion is used, a remainder of the anodized surface 409 may be selectively masked, so as to inhibit substantially any removal of the remainder of the anodized surface 409 (i.e. the remainder 409 that is not intended to be stripped.) In any case, remainder of the anodized surface is shown in FIGS. 4C and 4D.

In particular, at least some anodization may be removed from the tabs or flanges 405A, 405B of the pivot plates 401, 402, so as to provide for the tabs or flanges 405A, 405B being substantially electrically conductive. Removing the anodization from the tabs or flanges 405A, 405B of the pivot plates 401, 402 may comprise laser ablating the anodization from the tabs or flanges 405A, 405B of the pivot plates 401, 402. Alternatively, the acid solution may be use to remove the anodization from the tab or flange of the pivot plate.

As yet another alternative, selective removal of anodization from the anodized surface may be avoided by using masking techniques, or otherwise selectively inhibiting anodization of predetermined locations, such as selectively inhibiting anodization of the tabs or flanges 405A, 405B of the pivot plates 401, 402, while selectively anodizing remainder portions of the base metal structures.

FIG. 4D illustrates altered surfaces 404A, 404B, 404C, 404D that were selectively formed on the unanodized surfaces, which were just discussed with respect to FIG. 4C. The altered structures 404A, 404B, 404C, 404D are formed by optical energy 408 produced by a laser 410 (e.g., infrared wavelength laser). The altered surfaces 404A, 404B, 404C, 404D combine to provide marking of the metal structures. For example, the altered surfaces 404A, 404B, 404C, 404D may appear to be black and thus when selectively formed can provide marking.

Fluence of the optical energy may be above the damage threshold fluence for the base metal structures, for forming the altered structures 404A, 404B, 404C, 404D. However, notwithstanding the foregoing, it should be understood that fluence of the optical energy that forms the altered structures 404A, 404B, 404C, 404D on the altered surfaces of the base metal structure may be selected to be approximately below the ablation threshold fluence for the base metal structure. Fluence of the optical energy that forms the altered structures on the altered surfaces of the base metal structurea may be selected so that non-ablative laser-material interactions such as heating, surface melting, surface vaporization and/or plasma formation predominate over any ablation. In other words, by exercising due care in selection of the fluence of the optical energy that forms the altered structures on the altered surfaces of the base metal structures; ablation, which may be characterized by direct evaporation the metal, in an explosive boiling that forms a mixture of energetic gases comprising atoms, molecules, ions and electrons, may not predominate over non-ablative laser-material interactions, such as heating, surface melting, surface vaporization and/or plasma formation.

The laser 410 may include a galvanometer mirror or other arrangement for raster scanning a spot of the optical energy over the unanodized surface, so as to form the altered structures into a rasterized depiction of the marking. Suitable pitch between raster scan lines of the scanning spot may be selected. For example, a suitable pitch may be a fine pitch of about thirteen (13) microns. The laser may further include optics for contracting or expanding size of the spot of the optical energy, by focusing or defocusing the spot. Expanding size of the spot, by defocusing the spot may be used to select fluence of the optical energy. In particular, expanding size of the spot may select fluence of the optical energy to be approximately below the ablation threshold fluence for the base metal structure. Spot size of the optical energy for the nanosecond class laser mentioned previously herein may be within a range from approximately fifty (50) microns to approximately one hundred (100) microns; and spot size may be about seventy (70) microns.

FIG. 4E is a table illustrating exemplary laser operation parameters for marking the metal structure according to one embodiment. In particular, the table of FIG. 4E shows examples of various suitable laser models which may be used for marking the metal structure. The FOBA DP20GS is a Diode Pumped Solid State Neodymium-Doped Yttrium Orthovanadate (DPSS YVO4) type laser, which is available from FOBA Technology and Services GmbH, having offices at 159 Swanson Road, Boxborough, Mass. The SPI 12W/SM AND SPI 20W/SM are fiber type lasers, which are available from SPI Lasers UK, having offices at 4000 Burton Drive, Santa Clara, Calif. The Lumera is a picosecond type laser, which is available from LUMERA LASER GmbH, having an office at Opelstr. 10, 67661 Kaiserslautern Germany. It should be understood that the table of FIG. 4E shows approximate exemplary laser operating parameters, and that various other laser operating parameters may be selected to provide the fluence of the optical energy that forms the altered structures of the base metal structure, wherein the fluence may be selected to be approximately below the ablation threshold fluence for the base metal structures.

Figure 4F:
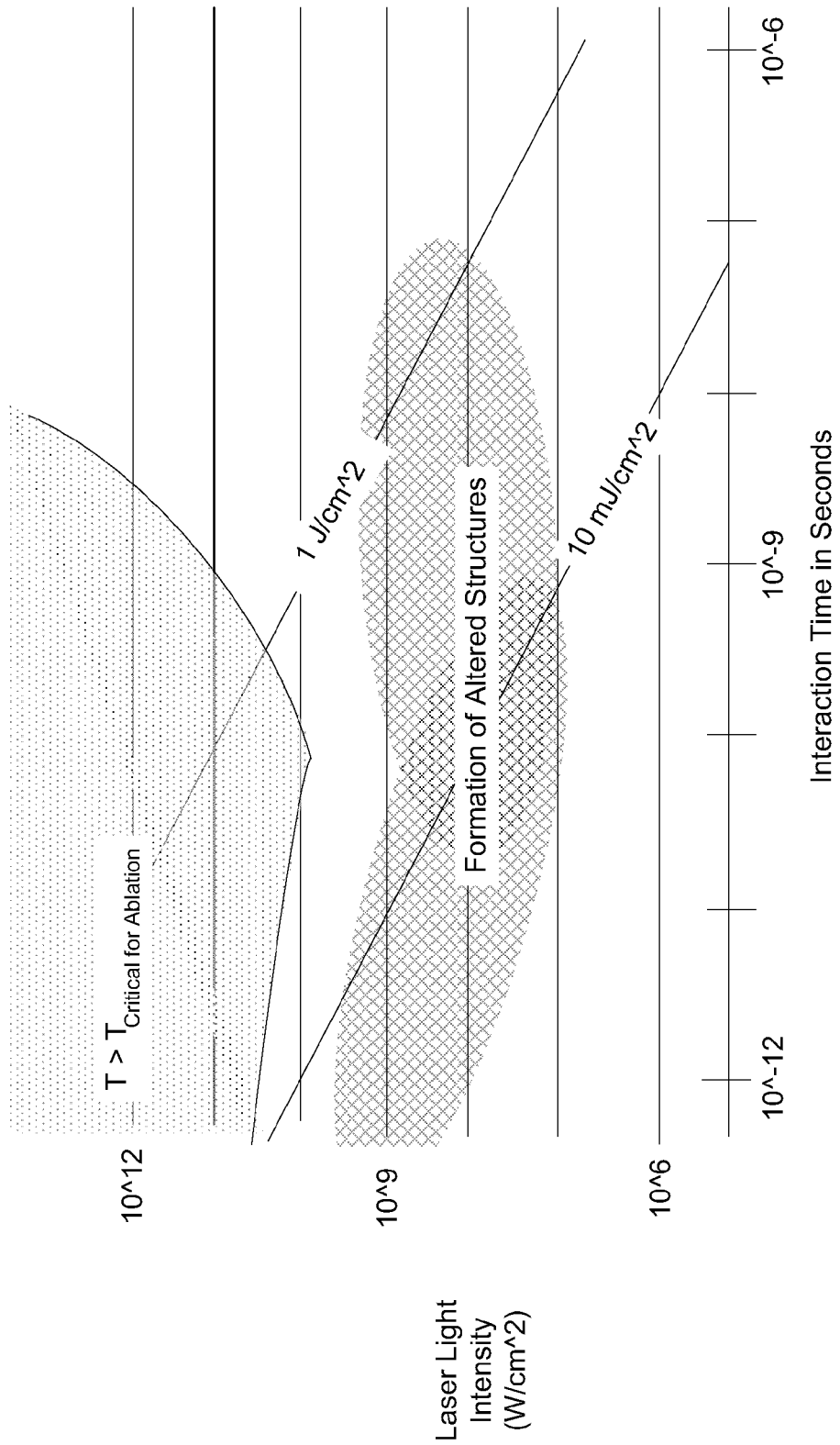
FIG. 4F is a diagram further illustrating exemplary laser operation parameters for marking the metal structures according to one embodiment.

FIG. 4F is a diagram further illustrating exemplary laser operation parameters for marking the metal structures according to one embodiment. In the diagram of FIG. 4F, irradiance of Laser Light Intensity in Watts per square centimeter is shown along a vertical axis, while Interaction Time of each pulse of the laser light (optical energy) with the metal structures is shown in fractions of a second along a horizontal axis. For illustrative reference purposes, diagonal lines of constant fluence of approximately ten (10) milli-Joules per square centimeter and of approximately one (1) Joule per square centimeter are shown in FIG. 4F. For substantially avoiding ablation of the metal structures during marking, excessively high laser light intensity may be avoided, so that a temperature "T" of the metal structure may not substantially exceed a critical temperature for ablation of the metal structures. For example, a stippled region of exemplary excessively high laser light intensity is shown in FIG. 4F, along with a descriptive legend T>T critical for ablation. FIG. 4F further shows a cross hatched region of suggested approximate laser operation parameters, which may form the altered structures.

Figure 4G:
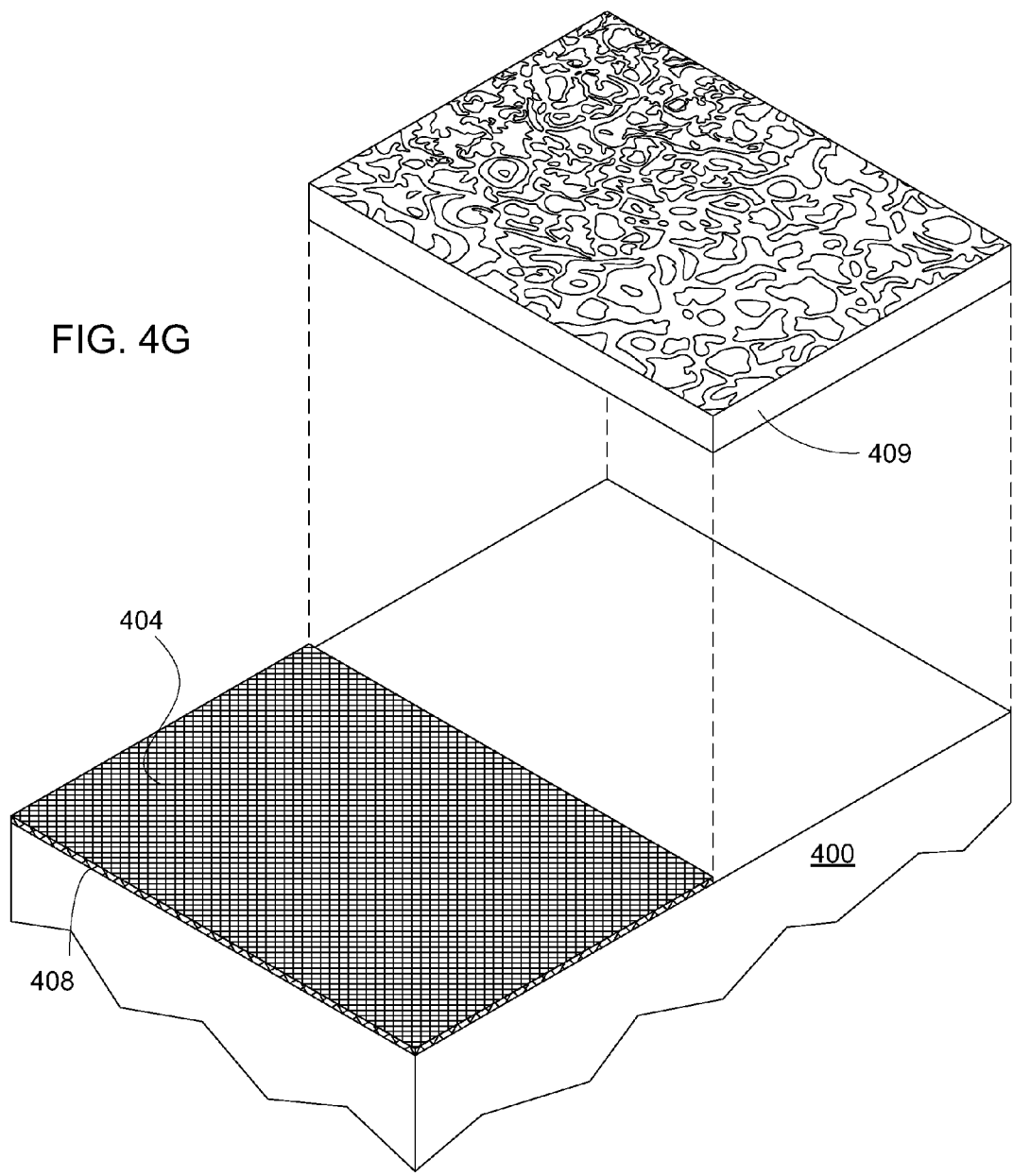
FIGS. 4G-4I are diagrams of various views representative of two-hundred times magnification photomicrographs of marking the metal structure according to one embodiment.
Figure 4H:
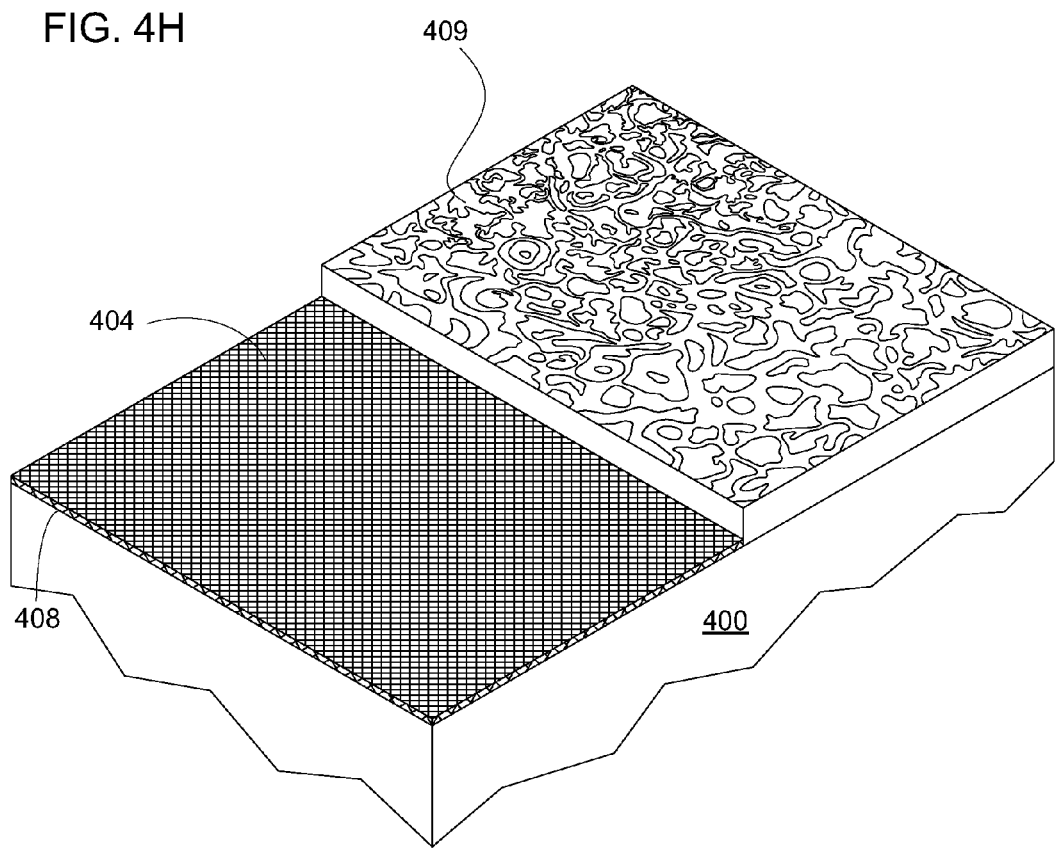
Figure 4I:
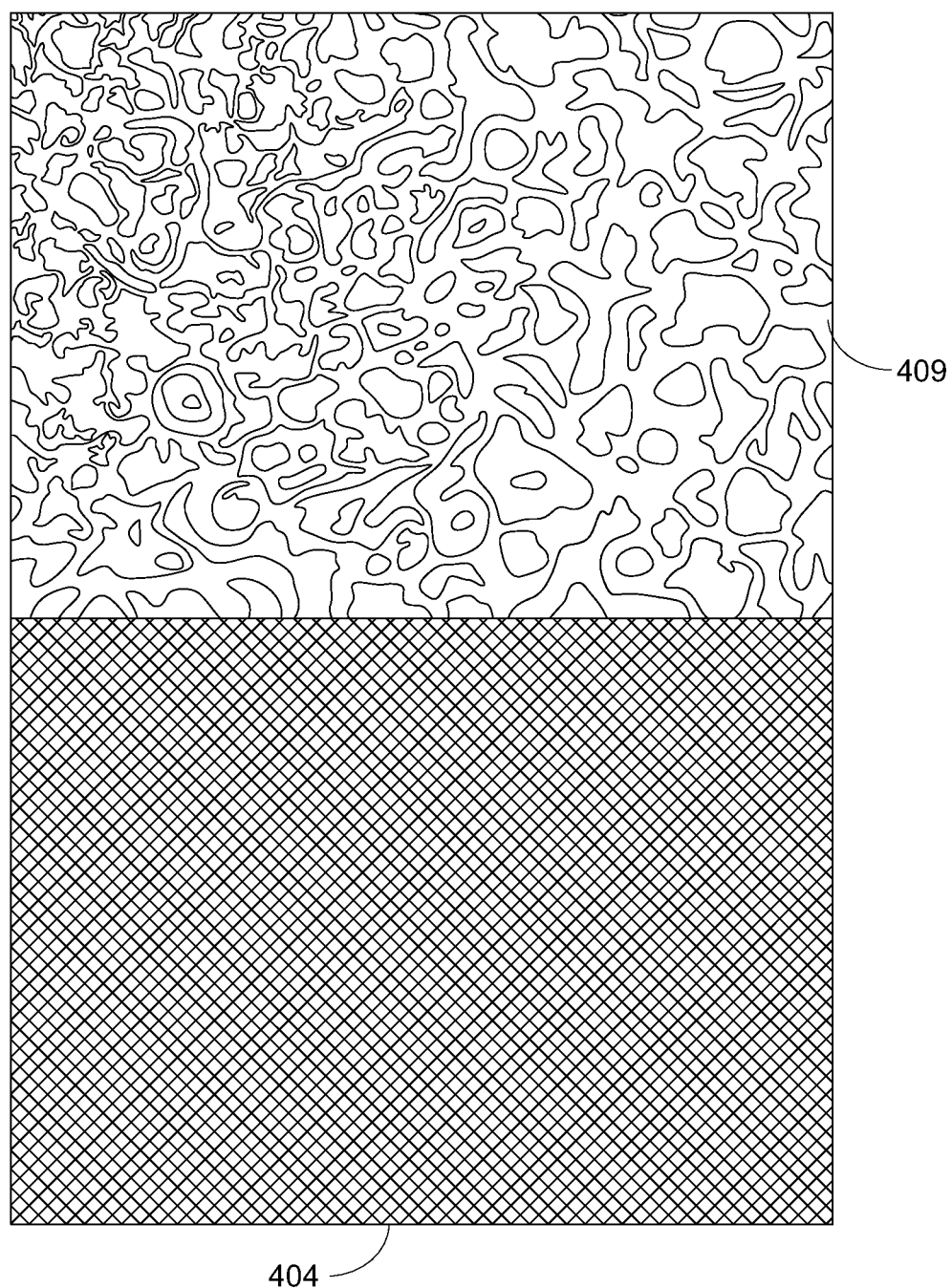

FIGS. 4G-4I are diagrams of various views representative of two-hundred times magnification photomicrographs of marking the metal structure according to one embodiment. In FIG. 4G, the anodized surface 409 is shown exploded away from an inner unanodized surface 408 of the base metal structure 400 in isometric view, so as to show clearly the inner unanodized surface 408 of the base metal structure 400. Also shown is adjacent altered structures 404A, 404B, 404C, 404D (which are particularly highlighted using cross hatching.) The anodized surface 409, the altered structures 404 and the inner unanodized surface 408 of the base metal structure 400 are shown in a collapsed isometric view in FIG. 4H, and in a top view in FIG. 4I. The anodized surface 409 may appear substantially optically transparent in FIGS. 4G through 4I, however slight curved island surface features of the anodized surface 409 may be seen under the two-hundred times magnification.

Figure 5:
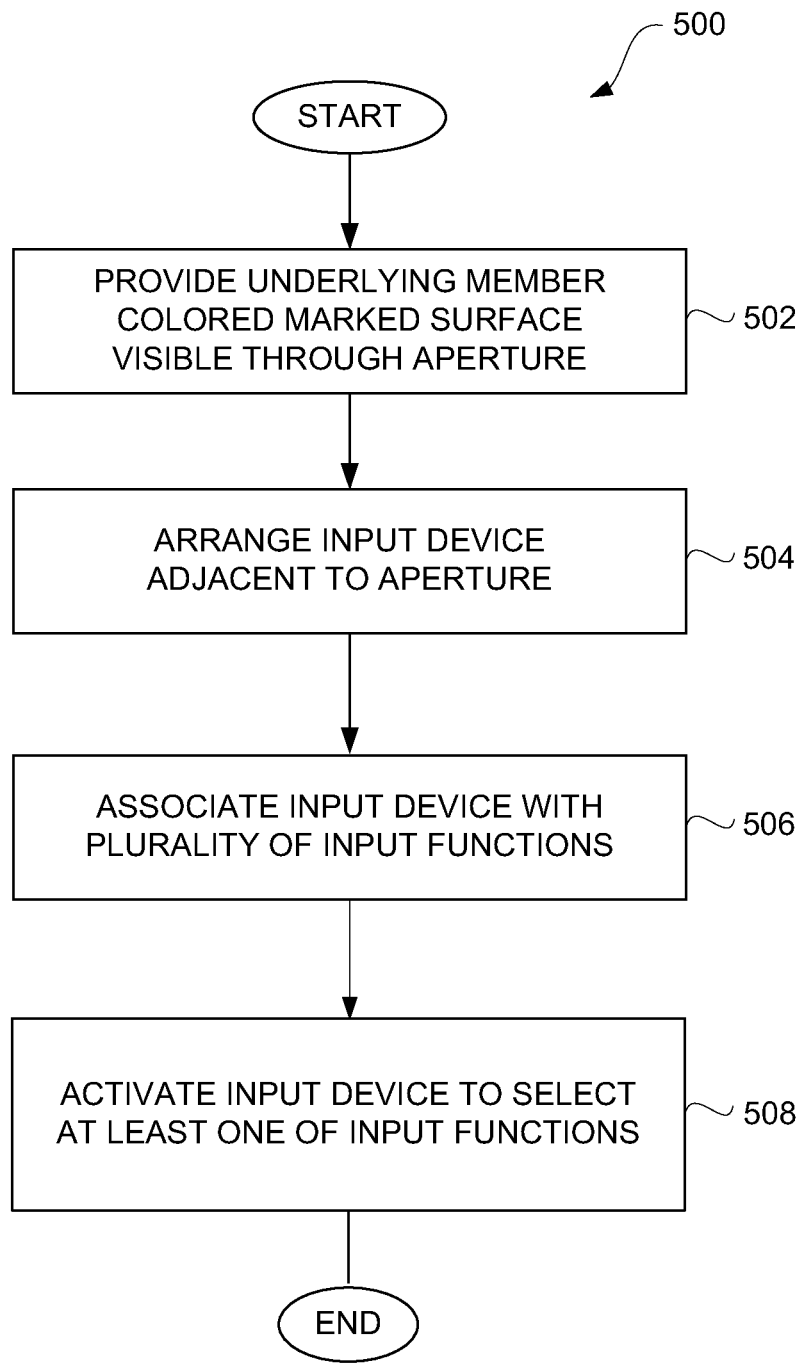
FIG. 5 is a flow diagram illustrating a process of one embodiment for interacting with a consumer electronic product.

FIG. 5 is a flow diagram illustrating a process 500 of one embodiment for interacting with a consumer electronic product. The process may begin with providing 502 an aperture extending inwardly from the outer surface of the consumer electronic product, and an underlying member having a colored marked surface of the underlying member, which is substantially visible through the aperture in the outer surface of the consumer electronic product. The colored marked surface of the underlying member, which is substantially visible through the aperture, may comprises a laser marked surface. The process 500 may continue with arranging 504 an input device of the consumer electronic product adjacent to the aperture extending inwardly from the outer surface of the consumer electronic product. The process 500 may continue with 506 associating the input device with a plurality of input functions. The process 500 may continue with 508 activating the input device to select at least one of the plurality of input functions. The input device may comprises a pivot plate having a perimeter, and the aperture may comprise an annular aperture interposed between the perimeter of the pivot plate and a remainder portion of the consumer electronic product. Activating the input device to select at least one of the plurality of input functions may comprise tilting the pivot plate. Once the input device has been activated to select at least one of the plurality of input functions, the process 500 can end.

Figure 6:
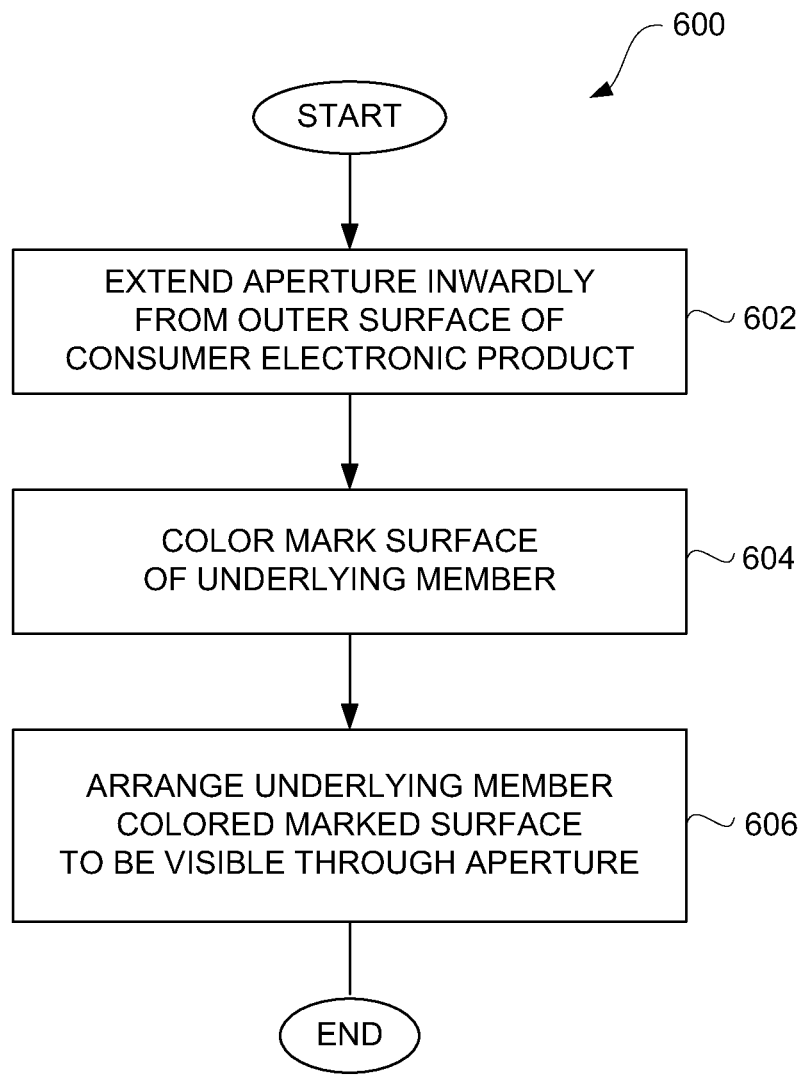
FIG. 6 is a flow diagram illustrating a process of another embodiment.

FIG. 6 is a flow diagram illustrating a process 600 of another embodiment. The process 600 may begin with extending 602 an aperture inwardly from an outer surface of the consumer electronic product. The process 600 may continue with color marking 604 a surface of an underlying member, so as to provide a colored marked surface of the underlying member. The color marking may comprise laser marking. Laser marking may comprise selecting laser operating parameters so that the colored marked surface is substantially electrically conductive, as discussed in detail previously herein. The process 600 may continue with arranging 606 the colored marked surface of the underlying member so that the colored marked surface of the underlying member is substantially visible through the aperture extending inwardly from the outer surface of the consumer electronic product. The arranging of the colored marked surface may comprise arranging the substantially electrically conductive laser marked surface in the consumer electronic product so as to substantially reduce any accumulation of electrical charge at the underlying member. Once the colored marked surface of the underlying member has been arranged, the process 600 can end.

Additional information on product marking as well as other manufacturing techniques and systems for electronic devices are contained in U.S. Provisional Patent Application No. 61/059,789, filed Jun. 8, 2008, and entitled "Methods and Systems for Manufacturing an Electronic Device," which is hereby incorporated herein by reference.

This application is also references: (i) U.S. Provisional Patent Application No. 61/121,491, filed Dec. 10, 2008, and entitled "Techniques for Marking Product Housings," which is hereby incorporated herein by reference; (ii) U.S. patent application Ser. No. 12/358,647, filed Jan. 23, 2009, and entitled "Method and Apparatus for Forming a Layered Metal Structure with an Anodized Surface," which is hereby incorporated herein by reference; (iii) U.S. patent application Ser. No. 12/475,597, filed May 31, 2009, and entitled "Techniques for Marking Product Housings," which is hereby incorporated herein by reference; and (iv) U.S. Provisional Application No. 61/252,623, filed Oct. 16, 2009 and entitled "SUBSURFACE MARKING OF PRODUCT HOUSINGS," which is hereby incorporated herein by reference.

The various aspects, features, embodiments or implementations of the invention described above can be used alone or in various combinations.

Different aspects, embodiments or implementations may, but need not, yield one or more of the following advantages. One advantage may be that ease of use of consumer electronic products may be improved. Particular arrangements of input devices may provide enhancements in ease of use. Another advantage may be that cosmetic laser marking, for example cosmetic laser marking of input devices, may provide improved visual appearance of the consumer electronic products. Another advantage may be that selectively controlling laser operation parameters during laser marking may provide laser marking that may be substantially electrically conductive. This in turn may be helpful in electrostatic discharge protection.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An apparatus comprising:
    a consumer electronic product having an outer surface and an input device;
    an aperture extending inwardly from the outer surface of the consumer electronic product; and
    a colored marked recessed surface, the color marked recessed surface being at least a portion of an underlying member associated with the input device, wherein the colored marked recessed surface is recessed so as to be at least partially visible through the aperture in the outer surface of the consumer electronic product, and wherein the colored marked recessed surface is substantially electrically conductive and arranged so as to substantially reduce any accumulation of electrical charge.

2. An apparatus as recited in claim 1 wherein the colored marked recessed surface is darkly colored.

3. An apparatus as recited in claim 1 wherein the colored marked recessed surface is substantially brown in color.

4. An apparatus as recited in claim 1 wherein the colored marked recessed surface is substantially black in color.

5. An apparatus as recited in claim 1 wherein the colored marked recessed surface is laser marked.

6. An apparatus as recited in claim 1 wherein the input device is arranged adjacent to the aperture extending inwardly from the outer surface of the consumer electronic product.

7. An apparatus as recited in claim 1,
    wherein the input device includes a plurality of switches associated with a plurality of input functions, each switch being configured to detect at least a respective one, or more, of a plurality of user inputs; and
    wherein the apparatus further comprises a processor configured to generate a respective one of a plurality of signals associated with performing a respective one of a plurality of tasks in accordance with each of the user inputs.

8. An apparatus as recited in claim 1 wherein the input device provides a plurality of select functions.

9. An apparatus as recited in claim 1 wherein the input device provides a plurality of input functions, wherein the plurality of input functions comprise at least one of Play, Pause, Volume Up, Volume Down, Previous, Rewind, Next, and Fast Forward functions.

10. An apparatus as recited in claim 1,
    wherein the input device associated with a plurality of input functions, and
    wherein the apparatus further comprises a processor configured to generate a respective one of a plurality of signals associated with performing a respective one of a plurality of tasks in accordance with each of a plurality of user inputs, wherein each the signals is associated with a respective one of a plurality of commands for performing a respective one of the plurality of input functions.

11. An apparatus as recited in claim 1 wherein the input device provides a plurality of input functions, wherein at least some of the plurality of input functions are associated with top, bottom, left, right and center locations of the input device.

12. An apparatus as recited in claim 1 wherein the colored marked recessed surface is coupled with a pivot member arranged adjacent to the aperture.

13. An apparatus as recited in claim 1 wherein the input device comprises:
a central pivot member; and
a satellite pivot member,
wherein the central pivot member and the satellite pivot member are concentrically arranged, and wherein the colored marked recessed surface is coupled with at least one of the central pivot member and the satellite pivot member.

14. An apparatus as recited in claim 1 wherein the aperture comprises an annular aperture, and wherein the colored marked recessed surface is recessed so as to be at least partially visible through the annular aperture in the outer surface of the consumer electronic product.

15. An apparatus as recited in claim 1 wherein the colored marked recessed surface is coupled with a pivot member having a perimeter, wherein the aperture comprises an annular aperture interposed between the perimeter of the pivot member and a remainder portion of the consumer electronic product, and wherein the colored marked recessed surface is recessed so as to be at least partially visible through the annular aperture in the outer surface of the consumer electronic product.

16. An apparatus as recited in claim 1 wherein the input device comprises:
a central pivot member; and
a satellite pivot member, wherein the aperture comprises an annular aperture interposed between the central pivot member and the satellite pivot member,
wherein the colored marked recessed surface is recessed so as to be at least partially visible through the annular aperture in the outer surface of the consumer electronic product, and wherein the colored marked recessed surface is coupled with at least one of the central pivot member and the satellite pivot member.

17. An apparatus as recited in claim 1 wherein the input device comprises a pivot member having a tab extending therefrom, wherein the colored marked recessed surface is coupled with the tab extending from the pivot member.

18. An apparatus as recited in claim 1 wherein the input device comprises a pivot member having a perimeter flange, wherein the colored marked recessed surface is coupled with the perimeter flange of the pivot member.

19. An apparatus as recited in claim 1 wherein the input device comprises a pivot member, wherein the pivot member comprises a metal.

20. An apparatus comprising:
a consumer electronic product having an outer surface;
an annular aperture extending inwardly from the outer surface of the consumer electronic product;
an input device provided adjacent the annular aperture, the input device including an underlying member; and
a laser marked recessed surface coupled with at least a portion of the underlying member of the input device, wherein the laser marked recessed surface is arranged so as to be substantially visible through the aperture in the outer surface of the consumer electronic product, wherein the laser marked recessed surface is substantially electrically conductive and arranged substantially so as to reduce any accumulation of electrical charge.

21. An apparatus as recited in claim 20 wherein the laser marked recessed surface of is coupled with the underlying member and is darkly colored.

22. A method of interacting with a consumer electronic product comprising:
providing an aperture extending inwardly from an outer surface of the consumer electronic product;
arranging an input device of the consumer electronic product adjacent to the aperture extending inwardly from the outer surface of the consumer electronic product;
providing a colored marked recessed surface, the colored marked recessed surface being at least a portion of an underlying member associated with the input device, the colored marked recessed surface being recessed so as to be substantially visible through the aperture in the outer surface of the consumer electronic product, and the colored marked recessed surface is substantially electrically conductive and arranged so as to substantially reduce any accumulation of electrical charge;
associating the input device with a plurality of input functions; and
activating the input device to select at least one of the plurality of input functions.

23. A method as recited in claim 22 wherein the colored marked recessed surface comprises a laser marked surface.

24. A method as recited in claim 22,
wherein the input device comprises a pivot member having a perimeter, the aperture comprises an annular aperture interposed between the perimeter of the pivot member and a remainder portion of the consumer electronic product, the colored marked recessed surface is recessed so as to be substantially visible through the annular aperture, and
wherein the activating of the input device to select at least one of the plurality of input functions comprises tilting the pivot member.

25. A method as recited in claim 24 wherein the providing the colored marked surface comprises:
anodizing a tab extending outwardly from the pivot member;
electrically conductive color marking and removing anodization from the tab of the pivot member, so as to provide for the tab being colored marked recessed and substantially electrically conductive.

26. A method as recited in claim 25 where the removing the anodization from the tab of the pivot member comprises ablating the anodization from the tab of the pivot member.

27. A method as recited in claim 25 wherein the electrically conductive color marking comprises laser marking a surface of the tab of the pivot member.

28. A method comprising:
extending an aperture inwardly from an outer surface of a consumer electronic product, the consumer electronic product including an input device;
color marking a surface of an underlying member associated with the input device, so as to provide a colored marked surface of the underlying member; and
recessed arranging the colored marked surface of the underlying member so that the colored marked surface is recessed and substantially visible through the aperture extending inwardly from the outer surface of the consumer electronic product, wherein the colored marking comprises laser marking, and
wherein the arranging of the colored marked recessed surface comprises arranging the substantially electrically conductive laser marked surface in the consumer electronic product so as to substantially reduce any accumulation of electrical charge at the underlying member.

29. A method as recited in claim 28 wherein:
the color marking comprises laser marking; and
the laser marking comprises selecting laser operating parameters so that the colored marked surface is substantially electrically conductive.

* * * * *